Dec. 14, 1965
Z. J. LANSKY ETAL
3,223,120
SOLENOID OPERATED VALVE ASSEMBLY
Filed Aug. 7, 1963
2 Sheets-Sheet 1
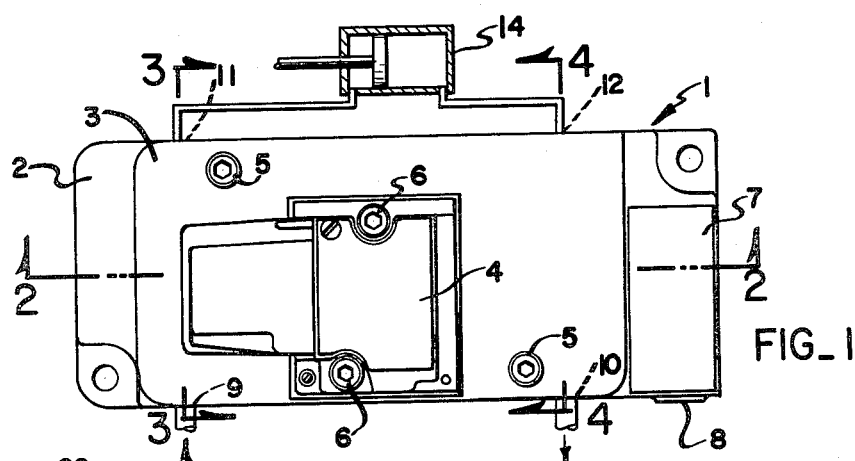
FIG_1
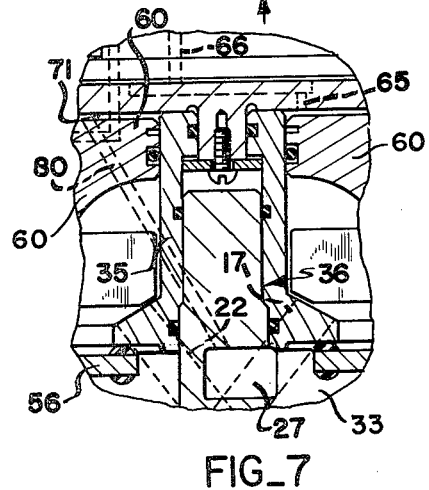
FIG_7
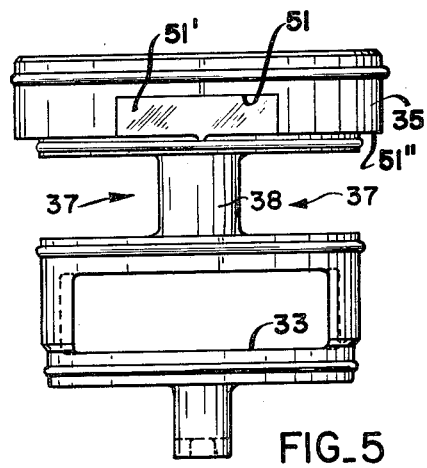
FIG_5
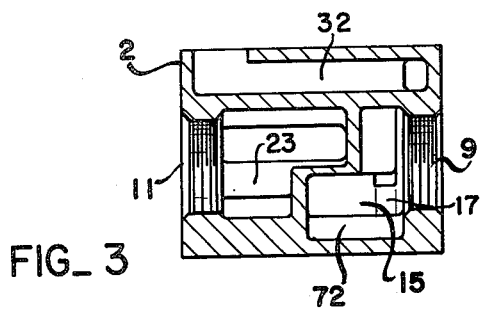
FIG_3
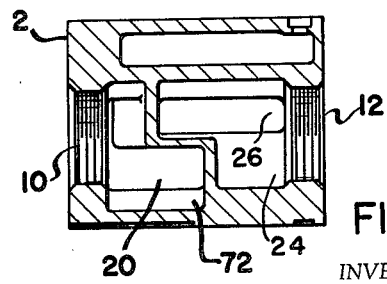
FIG_4
INVENTOR.
ZDENEK J. LANSKY
JOSEPH D. WENGHOFER
BY
John N. Wolfram
ATTORNEY

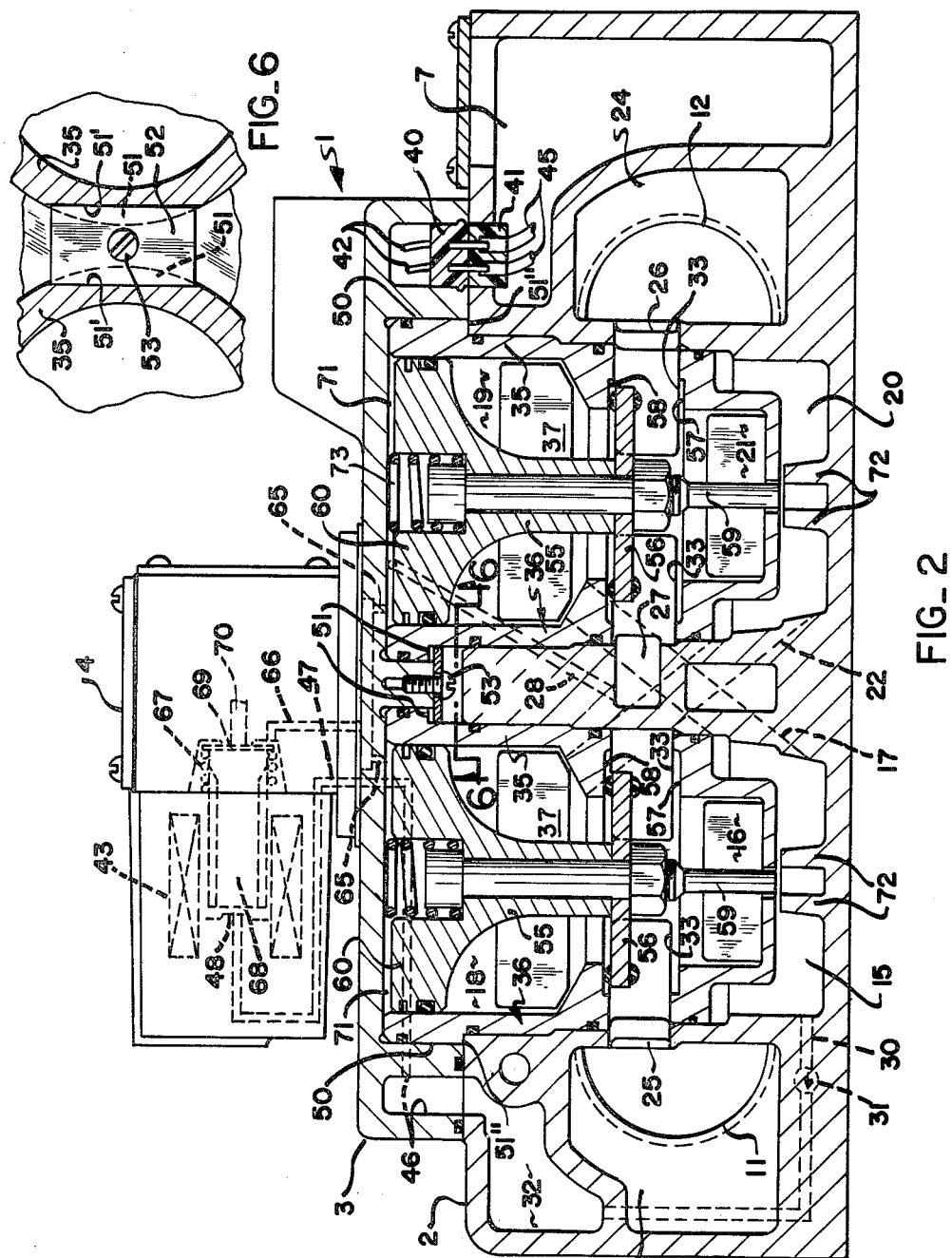

United States Patent Office 3,223,120
Patented Dec. 14, 1965

3,223,120
SOLENOID OPERATED VALVE ASSEMBLY
Zdenek J. Lansky, Winnetka, and Joseph D. Wenghofer, Des Plaines, Ill., assignors to Parker-Hannifin Corporation, Cleveland, Ohio, a corporation of Ohio
Filed Aug. 7, 1963, Ser. No. 300,441
18 Claims. (Cl. 137—596.16)

The present invention relates generally as indicated to a solenoid operated valve assembly and more particularly to a valve assembly of the multiple separable block type in which there is provided a base or distributing block to which all the fluid and electric conduit connections are made; a main valve block containing fluid pressure operated valve members for controlling the flow of fluid under pressure through the fluid system, and containing an electric plug element which disconnects from a complemental socket element in the base block upon removal of the valve block therefrom; and a solenoid block containing at least one solenoid operated pilot valve for controlling the fluid pressure actuation of the main valve members in the valve block, the valve block having electric leads extending from the plug element to the solenoid coil in said solenoid block.

It is an object of this invention to provide a solenoid operated valve assembly of the character indicated which is compact in size by reason of nesting together of major portions of the distributing block and valve block.

It is another object of this invention to provide a solenoid operated valve assembly in which the main valves are in the form of cartridges carried by the valve block in parallel arrangement for nesting or telescoping in transverse bores in the distributing block, whereby disconnection of said blocks axially withdraws the main valve cartridge from the distributing block; likewise the complemental electric plug and socket elements through which electric current is conducted from the electric supply line connected with the distributing block to the solenoid of the solenoid block are disposed in parallel relation to the main valve cartridges so that separation of the valve block and the distributing block automatically disconnects the complemental electric plug and socket elements.

It is another object of this invention to provide a solenoid operated valve assembly in which the main valve cartridges aforesaid are removably carried by the valve block for service or replacement.

It is another object of this invention to provide a solenoid operated valve assembly in which the bodies of the main valve cartridges are of stepped formation carrying packing rings making sealed engagement with correspondingly stepped bores in the distributing block, whereby said bodies may be readily withdrawn from the distributing block upon separation of the valve block from the distributing block.

It is another object of this invention to provide a solenoid operated valve assembly in which the body of each main valve cartridge is integrally formed with widely spaced guides for movement of the main valve member therein and with spaced seats alternately engaged by said valve member.

It is another object to provide a valve having two fluid pressure operated valve plungers for controlling a main fluid supply in which one of the plungers is operated by pressurized fluid controlled by a pilot valve and the other plunger is operated by fluid from the main supply and controlled by the pilot operated plunger whereby the volume of pilot valve controlled fluid, and hence the response time for operating the valve, is reduced as compared with arrangements in which both plungers are operated by pilot valve controlled fluid.

Other objects and advantages of the present invention will become apparent as the following description proceeds.

To the accomplishment of the foregoing and related ends, the invention, then comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:
FIG. 1 is a top plan view of one embodiment of the present invention,
FIG. 2 is a longitudinal vertical cross section view on enlarged scale along line 2—2 of FIG. 1,
FIGS. 3 and 4 are transverse cross section views taken substantially along the lines 3—3, and 4—4, of FIG. 1,
FIG. 5 is a side view of one of the cartridges or bodies which receive the valve members as viewed from the right in FIG. 2,
FIG. 6 is a fragmentary cross section view taken substantially along the line 6—6 of FIG. 2, and
FIG. 7 is a fragmentary section view of a modified form of the invention.

Referring now more particularly to the drawings, especially FIGS. 1 to 4, the solenoid operated valve assembly 1 herein comprises a base or distributing block 2, a main valve block 3, and a solenoid pilot valve block 4, these blocks being secured together as by the respective screws 5, 5 and 6, 6.

The distributing block 2 is preferably an aluminum or like die casting having an integral electric junction box portion 7 to the port 8 of which an electric supply conduit is adapted to be connected. The distributing block 2 is also formed with a pressure inlet port 9, an exhaust port 10, and motor ports 11 and 12 adapted for connection with a fluid motor 14.

As hereinafter explained in detail, actuation of a pilot valve in the solenoid block 4 as by energization of a solenoid coil in said block operates main valves carried by the valve block 3 to selectively communicate the inlet and exhaust ports 9 and 10 with the motor ports 11 and 12, thus to control actuation of fluid motor 14.

Referring now in detail to the structure of the solenoid operated valve assembly herein, as best shown in FIGS. 2 to 6, the distributing block 2 is partitioned and cored to provide an inlet chamber 15 which leads from inlet port 9 (via passages 16 and 17) into the lower and upper ends of the respective cylindrical main valve chambers 18 and 19, an exhaust chamber 20 which leads from exhaust port 10 (via passages 21 and 22) into the lower and upper ends of the respective chambers 19 and 18, and motor chambers 23 and 24 which lead from the respective motor ports 11 and 12 (via passages 25 and 26) into the respective chambers 18 and 19 between the upper and lower ends of the latter. A passage 27 is in constant communication with motor chamber 24 via lateral openings 33 in cartridge 36 and passage 26 and connects by means of a passage 28 in distributing block 2 and valve block 3 to the upper end of chamber 19. Communicating with the pressure inlet chamber 15 is a passage 30 having a check valve 31 therein through which air pressure is conducted into a chamber 32 which opens in the top plane face of the distributing block 2.

The chambers 18 and 19 are in the form of parallel stepped bores which open at the top plane face of the distributing block 2 to receive the complemental stepped cartridge bodies 35, 35 of the main valve cartridges 36, 36 which are carried by the valve block 3, said bodies 35, 35 having lateral openings 37, 37 either registering with or constituting the passages 16, 22, 25 and 17, 21, 26 through the walls of the respective chambers 18 and 19.

As perhaps best seen in FIG. 5, preferably there are two of such openings 37 in the bodies 35, such openings 37 being disposed directly opposite each other and extending around a considerable portion of the periphery of the bodies 35, there being only narrow lands 38 separating such openings.

The valve block 3 is in the form of a cover member and has a plane bottom face which is clamped as by screws 5, 5 against the top plane face of the distributing block 2. Said valve block 3 has mounted therein an electric plug element 40 for engagement with and disengagement from the socket element 41 of the distributing block, the electric leads 42 passing through suitable registering passages (not shown) at the mating faces of the solenoid block 4 and valve block 3 and ultimately to the solenoid coil 43 which is detachably mounted on the solenoid block 4. The socket leads 45 in junction box portion 7 pass through port 8 to suitable switch means for energizing and de-energizing said solenoid coil 43. The valve block 3 also has a passage 46 therethrough which opens at its bottom face in registry with the opening of the chamber 32 and which opens at its top face in registry with a passage 47 in the solenoid block 4 which leads to a pilot valve seat 48.

The bottom of the valve block 3 has circular recesses 50, 50 which are coaxial with the stepped bores or chambers 18 and 19 of the distributing block 2, such recesses 50, 50 having telescoped therewith upper portions of the bodies 35, 35 of the main valve cartridges 36, 36. Said cartridge bodies 35, 35 are each formed with several peripheral grooves carrying suitable packing rings as shown which make fluid-tight engagement with the respective recesses 50, 50 and the stepped portions of the distributing block bores 18 and 19.

The nearest portions of the bodies 35, 35 are formed with ledges 51, 51 formed by milling flat spots 51, 51 on the bodies and adapted to be engaged by the plate 52 for withdrawing the main valve cartridges 36 from the distributing block 2 when the valve block 3 is separated from the distributing block 2. Said plate 52 is held on the valve block 3 by means of the screw 53, and if it be desired to bodily remove one or both cartridges 36 from valve block 3, the screw 53 and plate 52 may be removed.

Plate 52 also serves to angularly locate bodies 35, 35 within distributing block 2 so that passages 25, 26 and chamber 27 line up with slots 33 in the bodies to permit flow of fluid therebetween. This is accomplished by the fact that the sides of plate 52 have a close fit with flats 51, as shown in FIGURE 6.

Vertical positioning of bodies 35, 35 is accomplished by butting ledges 51″ on the bodies against the upper face of block 2.

Mounted for axial movement in each valve body 35 is a poppet type plunger valve member 55 having a head 56 carrying opposed sealing rings of rubber-like material which alternately engage one or the other of the opposed and axially spaced apart seat rings 57 and 58. Each valve member 55 has a lower stem portion 59 guided in an opening through the bottom of body 35. The upper end of each valve member 55 is guided in body 35 and constitutes a plunger 60 which moves the valve member 55 downward to engage head 56 with seat 57 when fluid pressure is admitted into the chamber above plunger 60, the spring 73 assisting in such movement. Said plunger 60 is effective to move valve member 55 upwardly to engage head 56 with seat 58 when there is fluid under pressure in the chamber below plunger 60.

The valve block 3 has passages 65 leading from the respective recesses 50 and opening in the top face of said valve block 3 in register with a passage 66 in the solenoid block 4.

When the solenoid coil 43 is de-energized, the spring 67 acting on the armature valve 68 holds it in a position disengaged from the seat 48 and engaged with the seat 69 at the end of a passage 70 which leads to the exhaust chamber 20 of the distributing block 2 via a passage (not shown) through the valve block 3. Thus, in the de-energized condition of the solenoid coil 43 fluid under pressure from the inlet chamber 15 flows through the passage 30 and check valve 31, chamber 32, and passages 46, 47, 66, and 65, into operating chambers 71, 71 to act downwardly on the plungers 60, 60, thus forcing the valve members 55 downwardly to engage heads 56 with seats 57. Accordingly, fluid under pressure in the inlet chamber 15 flows through the passage 17 in the distributing block 2 into the right chamber 19 and through open seat 58, passage 26, motor chamber 24, and motor port 12 to thus move the piston in motor 14 to the left as viewed in FIG. 2. The other motor port 11 and chamber 23 is communicated with the exhaust chamber 20 via passage 25, open seat 58 and passage 22.

When it is desired to actuate the fluid motor 14 in the opposite direction, the solenoid coil 43 is energized thus pulling the armature valve 68 toward the left into engagement with seat 48 and out of engagement with seat 69, whereby the chambers 71 are exhausted via passages 65, 66 and 70 which lead to the exhaust chamber 20 and port 10. When the chambers 71 are thus exhausted, fluid under pressure in the chamber 15 acting on the underside of the head 56 of the left valve member 55 forces the same upward into engagement with the seat 58, whereby fluid under pressure flows through the passage 16, open seat 57, passage 25, motor chamber 23 and motor port 11 to shift the piston in motor 14 to the right. At the same time, fluid under pressure entering the chamber 19 of the right valve member through the passage 17 acts on the underside of plunger 60 of the right valve member 55 to move head 56 thereof into engagement with seat 58 to communicate the associated motor port 12 and chamber 24 with the exhaust chamber 20 and port 10 via passage 26, open seat 57 and passage 21.

In the event that there is a loss of fluid pressure in the inlet chamber 15, the check valve 31 will trap sufficient compressed air in chamber 32 to actuate the valve members 55 downwardly at least once more upon de-energization of the solenoid coil 43.

Although in the example herein given, there is but one solenoid pilot valve assembly shown which requires maintained contact to hold the position where the armature valve 68 is held against the seat 48, it is to be understood that it is well known in the art to provide dual solenoid pilot valve assemblies to make possible only momentary energization of one or the other of the solenoids in order to hold both positions of the main valve assemblies.

It is to be noted that there is a clearance between the plate 52 and the ledges 51 of the cartridges 36 so that when the valve block 3 and distributing block 2 are to be separated from one another, the valve block 3 may easily be lifted the distance of such clearance for insertion of a suitable prying tool between the valve block 3 and the distributing block 2 for effecting withdrawing movement of the valve bodies out of the bores in the distributing block. In that connection, the packing rings around the bodies 35 are disposed near the ends of the respective stepped bore portions in the distributing block 2 so that after a relatively short distance of withdrawing movement of the valve bodies 35, the packing rings will be opposite larger bore portions to provide free and easy withdrawal of the bodies 35. Moreover, the recesses 50 in the valve block 3 are sufficiently close fits with the upper portions of the valve bodies for substantial lengths as shown, so as to preclude cocking even though lifting forces are applied only at the ledges 51. Furthermore, the locking plate 52 serves to rotatively align the cartridges 36 so that the lateral openings in the bodies 35 register with the passages in the stepped bores 18 and 19.

In the position of the valve members 55 shown in FIGURE 2, exhaust chamber 20 communicates with motor chamber 24 and thus no pressure is fed to chambers 71 through passages 28. It is understood that passage 28 is of smaller flow capacity than the exhaust passage 70 of the solenoid block 4 whereby pressure may be exhausted from chambers 71 through pilot valve seat 69 faster than it may enter through passage 28 while motor chamber 24 is communicated with inlet chamber 15 during energization of solenoid coil 43.

The distributing block 2 is preferably a thin walled, lightweight diecasting formed with reinforcing webs 72 as shown, for example, in FIGURES 2, 3 and 4, to prevent deformation by internal pressure. The partitions in said block 2 also perform reinforcing functions.

Another form of the invention is illustrated in FIGURE 7. In describing this modification, reference will be made to right and left hand portions of the valve assembly as viewed in FIGURES 2 and 7. In the FIGURE 7 form, passage 27 is connected by a passage 80 in blocks 2 and 3 to the left hand chamber 71. Passage 28 and left hand pasage 65, shown in FIGURE 2, are omitted.

With this arrangement, when solenoid 43 is deenergized for admitting fluid under pressure into passage 66, the fluid passes into right hand chamber 71 via right hand passage 65 to move right hand plunger 60 downwardly. Since left hand passage 65 is omitted, there is no fluid from passage 66 being delivered to left hand chamber 71. Instead, as soon as right hand plunger 60 moves downwardly to connect motor chamber 24 with pressure chamber 19 and disconnect the same from exhaust chamber 20, the ensuing pressure in motor chamber 24 is transmitted to left hand chamber 71 via openings 33, passage 27, and passage 80 to move left hand plunger 60 downwardly for connecting motor chamber 23 to exhaust chamber 20 and disconnecting it from pressure chamber 15. In this manner the pilot valve need supply a volume of fluid for moving only one of the plungers downwardly. Since this volume is roughly one half of that needed for moving both plungers, as in the FIGURE 2 form, the time for moving the one plunger is roughly one half the time required by the FIGURE 2 arrangement. Thus, the FIGURE 7 form provides faster operation than the FIGURE 2 form.

When the solenoid for the FIGURE 7 form is energized, passage 66 is connected to exhaust passage 70, as previously described. This vents right hand chamber 71 to permit pressure fluid in chamber 19 to raise right hand plunger 60 to disconnect motor chamber 24 from pressure chamber 19 and connect it to exhaust chamber 20. This in turn vents left hand chamber 71 to exhaust chamber 20 via passage 80, passage 27 and openings 33 to permit pressure fluid in chamber 15 to raise left hand plunger 60 to its upper position. Since the fluid from only the right hand chamber 71 exhausts through pilot valve passages 66 and 70, the time for doing so, and hence the time for raising right hand plunger 60, is less than when both chambers 71 exhaust through these passages. Moreover, passage 80, chamber 27, and openings 33 have a larger flow capacity than passages 65, 66 so that pressurizing and exhausting of left hand chamber 71 is accomplished in less time than in the FIGURE 2 form.

Other modes of applying the principle of the invention may be employed, change being made as regards the details described, provided the features stated in any of the following claims, or the equivalent of such, be employed.

We therefore particularly point out and distinctly claim as our invention:

1. A valve assembly comprising a distributing block having an inlet port for connection with a fluid pressure source, a motor port for connection with a fluid motor, and an exhaust port; said distributing block having a recess in one face thereof with openings communicating with the respective ports; a valve cartridge in said recess; and a cover detachably secured to said distributing block in overlying relation to said recess to retain said cartridge therein; said cartridge comprising a tubular valve body having passage means registering with such openings in said recess leading to said inlet, exhaust and motor ports as aforesaid, and having spaced apart seats; and a valve means movable in said body alternately into and out of engagement with said seats to establish fluid communication between said inlet and motor ports and between said motor and exhaust ports for actuating a fluid motor adapted to be connected with said motor port.

2. The valve assembly of claim 1 wherein said valve member has a plunger portion axially slidable in said body and defining therewith and with said cover chambers on opposite sides of said plunger portion, and wherein said block and cover have passage means selectively communicable with said inlet and exhaust ports and leading into said chambers to move said valve member in opposite directions in said body.

3. The valve assembly of claim 1 wherein the inside wall of said recess is of different diameters from one end to the other, such diameters progressively decreasing in size with the largest diameter being adjacent said one face of said distributing block; and wherein said body therein is of corresponding different diameters with packing rings therearound for sealing engagement with said wall, said packing rings being disposed around their respective diameters adjacent the next largest diameter, whereby, after a short distance of withdrawal of said cartridge, said packing rings are freed from engagement with said wall to facilitate complete withdrawal of said cartridge.

4. The valve assembly of claim 1 wherein there are a pair of motor ports for connection with a double-acting fluid motor and a pair of recesses in such one face of said distributing block with openings communicating with said inlet port, said exhaust port, and the respective motor ports; a valve cartridge in each recess; said cover overlying both of said recesses to retain said cartridges therein; each cartridge comprising a tubular valve body having passage means registering with openings in the respective recesses leading to said inlet, exhaust, and motor ports, and having spaced apart seats; and a valve means movable in each body alternately into engagement with said seats selectively to establish fluid communication between said inlet and motor ports and between said motor and exhaust ports for actuating a double-acting fluid motor adapted to be connected with said motor ports.

5. The valve assembly of claim 1 wherein means are provided on said cover to withdraw said cartridge therewith from said recess upon removal of said cover from said distributing block, said last-mentioned means and cover having lost-motion engagement with said cartridge, whereby said cover may be initially separated from said block a short distance before withdrawal of said cartridge commences; wherein the inside wall of said recess is of different diameters from one end to the other, such diameters progressively decreasing in size with the largest diameter being adjacent said one face of said distributing block; and wherein said body therein is of corresponding different diameters with packing rings therearound for sealing engagement with said wall, said packing rings being disposed around their respective diameters adjacent the next largest diameter, whereby, after a short distance of withdrawal of said cartridge, said packing rings are freed from engagement with said wall to facilitate complete withdrawal of said cartridge; and wherein said cartridge has a non-circular face, and means engaging said face for angularly locating said cartridge in said recess with said passage means in register with said openings, said last-mentioned means comprising a plate member secured to said distributing block adjacent said cartridge, said plate member having flat sides engaged with said non-circular surfaces.

6. The valve assembly of claim 1 wherein means are provided on said cover to withdraw said cartridge therewith from said recess upon removal of said cover from said distributing block.

7. The valve assembly of claim 6 wherein said last-mentioned means and cover have lost-motion engagement with said cartridge, whereby said cover may be initially separated from said block a short distance before withdrawal of said cartridge commences.

8. The valve assembly of claim 1 wherein said seats are integrally formed in said body; and wherein said valve member has a head of which opposite sides are alternately engaged with and disengaged from said seats upon movement of said valve member in opposite directions.

9. The valve assembly of claim 8 wherein said body has integral guides for the ends of said valve member that extend axially in opposite directions from said head.

10. A valve assembly comprising a housing having an inlet port, an exhaust port, first and second motor ports, and first and second operating chambers, first and second valve plunger means respectively associated with said first and second motor ports and respectively exposed to said first and second operating chambers, said plunger means being adapted to alternately connect the associated motor ports with said inlet and exhaust ports, a pilot valve controlled passage means for conveying fluid to said second operating chamber, and passage means for connecting said first operating chamber to said second motor port.

11. The valve assembly of claim 10 in which said passage means is of greater flow capacity than said pilot valve passage means.

12. The valve assembly of claim 10 in which said passage means is the sole means for conveying fluid to said first operating chamber.

13. The valve assembly of claim 10 in which a pilot valve controls the flow of fluid to said second operating chamber only.

14. The valve assembly of claim 10 in which a pilot valve also controls flow of fluid from said second operating chamber.

15. A valve assembly comprising a housing having an inlet port, an outlet port and a pair of motor ports, a pair of valve plunger means for controlling flow of fluid between selected pairs of said ports, a cartridge in said housing associated with one of said plunger means and providing passages for alternately connecting one of said cylinder ports with said inlet and exhaust ports, chamber means for receiving fluid for operating said plunger means, passage means connected to said chamber means, and additional passage means in said cartridge connecting one of said motor ports with said passage means.

16. The valve assembly of claim 15 wherein said additional passage means includes a lateral opening in said cartridge, and there is a means associated with said cartridge for angularly locating the same within said housing with said lateral opening in register with said passage means and said one of said motor ports.

17. A valve assembly comprising a housing having an inlet port, an outlet port, and a motor port, a valve plunger means for controlling flow of fluid between selected ones of said ports, a cartridge in said housing receiving said plunger means and providing passages between said ports, chamber means for receiving fluid for operating said plunger means, passage means connected to said chamber means, a lateral opening in said cartridge connecting said passage means with said motor port, a non-circular face on said cartridge, and means engaging said face for angularly locating said cartridge in said housing with said opening in register with said passage means.

18. The valve assembly of claim 17 wherein said last-mentioned means comprises a plate member secured to said housing adjacent said cartridge, said plate member having flat sides engageable with the non-circular surfaces for angularly locating said cartridges within the housing with said lateral opening in register with said passage means.

References Cited by the Examiner

UNITED STATES PATENTS

| | | | |
|---|---|---|---|
| 2,825,362 | 3/1958 | Hicks | 137—596.16 |
| 2,970,611 | 2/1961 | Hoge | 137—596.16 |
| 3,038,500 | 6/1962 | Lansky et al. | 137—596.16 |
| 3,126,915 | 3/1964 | Hunt | 137—625.64 |

M. CARY NELSON, *Primary Examiner.*

HENRY T. KLINKSIEK, *Examiner.*